United States Patent [19]

Janis

[11] Patent Number: 5,263,158
[45] Date of Patent: Nov. 16, 1993

[54] METHOD AND SYSTEM FOR VARIABLE AUTHORITY LEVEL USER ACCESS CONTROL IN A DISTRIBUTED DATA PROCESSING SYSTEM HAVING MULTIPLE RESOURCE MANAGER

[75] Inventor: Frederick L. Janis, Keller, Tex.

[73] Assignee: International Business Machines Corporation, Armonk, N.Y.

[21] Appl. No.: 480,440

[22] Filed: Feb. 15, 1990

[51] Int. Cl.⁵ ............ G06F 12/14; H04L 9/00
[52] U.S. Cl. ............ 395/600; 364/DIG. 1; 364/286; 364/286.4; 364/286.5; 364/286.6; 380/4; 380/23; 340/825.31; 340/825.34
[58] Field of Search ............ 395/425, 600; 380/4, 380/23; 340/825.31, 825.34

[56] References Cited

U.S. PATENT DOCUMENTS

| | | | |
|---|---|---|---|
| 4,584,665 | 4/1986 | Vrielink | 395/575 |
| 4,672,572 | 6/1987 | Alsberg | 380/23 |
| 4,719,566 | 1/1988 | Kelley | 340/825.34 |
| 4,839,640 | 6/1989 | Ozer et al. | 340/825.31 |
| 4,916,738 | 4/1990 | Chandra et al. | 380/25 |
| 4,924,378 | 5/1990 | Hershey et al. | 395/600 |
| 4,951,249 | 8/1990 | McClung et al. | 380/4 |
| 4,956,769 | 9/1990 | Smith | 395/600 |
| 5,018,096 | 5/1991 | Aoyama | 395/375 |
| 5,023,907 | 6/1991 | Johnson et al. | 380/4 |
| 5,077,658 | 12/1991 | Bender et al. | 395/600 |

Primary Examiner—Thomas C. Lee
Assistant Examiner—Krisna Lim
Attorney, Agent, or Firm—Andrew J. Dillon

[57] ABSTRACT

Variable authority level user access control for a plurality of resource objects within a distributed data processing system having a plurality of resource managers. A reference monitor service is established and a plurality of access control profiles are stored therein, each including an identification of a selected user and a specified level of authority associated with that selected user. Thereafter, selected access control profiles are exchanged between the reference monitor service and a resource manager in response to an attempted access of a particular resource object controlled by that resource manager. The resource manager may then control access to the resource object by utilizing the exchanged access control profile to determine the extent access is permitted by means of the specified level of authority contained therein. In a preferred embodiment of the present invention, the access intent of a selected user is determined in conjunction with an attempted access of a particular resource object and stored. Thereafter, a comparison of the stated access intent with the specified level of authority contained within the access control profile may be utilized to grant or deny access.

4 Claims, 3 Drawing Sheets

METHOD AND SYSTEM FOR VARIABLE AUTHORITY LEVEL USER ACCESS CONTROL IN A DISTRIBUTED DATA PROCESSING SYSTEM HAVING MULTIPLE RESOURCE MANAGER

CROSS-REFERENCE TO RELATED APPLICATIONS

This application relates in general to U.S. patent application Ser. No. 07/480,437, filed on Feb. 15, 1990 herewith entitled "METHOD AND SYSTEM FOR PROVIDING USER ACCESS CONTROL WITHIN A DISTRIBUTED DATA PROCESSING SYSTEM BY THE EXCHANGE OF ACCESS CONTROL, PROFILES," and U.S. patent application Ser. No. 07/480,442, filed on Feb. 15, 1990 herewtih, entitled "METHOD FOR PROVIDING USER ACCESS CONTROL WITHIN A DISTRIBUTED DATA PROCESSING SYSTEM HAVING MULTIPLE RESOURCE MANAGERS," by the inventor herein named and assigned to the Assignee hereof.

BACKGROUND OF THE INVENTION

1. Technical Field

The present invention relates to data processing systems in general and in particular to improved methods of providing access control for a plurality of resource objects within a distributed data processing system. Still more particularly, the present invention relates to a system which permits variable authority level access control throughout a distributed data processing system.

2. Description of the Related Art

Security and access control systems in computer based data processing systems are well known in the prior art. Existing access control systems are generally oriented to a single host system. Such single host access control systems are generally utilized to provide security for the host and access control to applications and system resources, such as files. Each application must generally provide access control for the resources controlled by that application.

One example of an access control system designed for utilization with the IBM 370 system is a product called RACF, or Resource Assets Control Facility. RACF offers access control for applications, such as files or CICS transactions and is hierarchically oriented in access authority levels and grouping of users. RACF is a "password" oriented access control system and access is granted or denied based upon a user's individual identity and his or her knowledge of an appropriate password to verify that identity. The RACF system is, however, oriented to a single host system and cannot be employed in a distributed data processing system which employs multiple hosts associated with separate groups of resource objects, due to the fact that this system does not allow the interchange of access control information from one host to another. Further, the RACF system does not permit a user to access a resource object at one of a plurality of authority levels. That is, for example, it may desired to permit a user to read a particular resource object, but not alter that object.

Another example of known access control systems is AS/400. The AS/400 system is a capability based system in which security is based upon each individual resource object. Each user is authorized to access individual resource objects based upon the user's capability within the system. The AS/400 system maintains security by keeping User Profiles, Object Authority, and System Values within the architecture of the machine itself. As above, this system is highly efficient at controlling access to resource objects controlled by a single host; however, access to resource objects located within a distributed data processing system containing multiple hosts cannot be controlled. That is, access to a resource object controlled by one host cannot be obtained by a user enrolled at a second host. As above, the AS/400 system does not permit the system controller to vary the level of authority enjoyed by a particular user with respect to a selected resource object.

One other example of an access control system is the DB2 product. This product permits a more flexible access control and offers granular or bundled access control authority. For example, the DB2 system may utilize special authorities for administration or database operations. Further, access privilege may be bundled into a specified authority or role so that a user may access specific resource objects based upon the user's title or authority level, rather than the user's personal identity. However, as above, the DB2 system does not possess the capability of exchanging access control information with non-DB2 applications.

Therefore, it should be obvious that a need exists for a method of providing variable authority level user access control in a distributed data processing system whereby access to selected resource objects may be controlled throughout the distributed data processing system by specifying the level of authority associated with a specific user for a selected resource object and then only permitting access to that resource object to the extent previously specified.

SUMMARY OF THE INVENTION

It is therefore one object of the present invention to provide an improved data processing system.

It is another object of the present invention to provide an improved method of providing access control for a plurality of resource objects within a distributed data processing system.

It is yet another object of the present invention to provide an improved method of providing access control for a plurality of resource objects within a distributed data processing system which permits a variable level of authority to be specified for each user within a distributed data processing system, with regard to specific resource objects.

The foregoing objects are achieved as is now described. The method of the present invention may be utilized to provide variable authority level user access control for a plurality of resource objects within a distributed data processing system having a plurality of resource managers. A reference monitor service is established and a plurality of access control profiles are stored therein, each including an identification of a selected user and a specified level of authority associated with that selected user. Thereafter, selected access control profiles are exchanged between the reference monitor service and a resource manager in response to an attempted access of a particular resource object controlled by that resource manager. The resource manager may then control access to the resource object by utilizing the exchanged access control profile to determine the extent access is permitted by means of the specified level of authority contained therein. In a preferred embodiment of the present invention, the access intent of a selected user is determined in conjunction with an attempted access of a particular resource object and stored. Thereafter, a comparison of the stated access intent with the specified level of authority contained within the access control profile may be utilized to grant or deny access.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
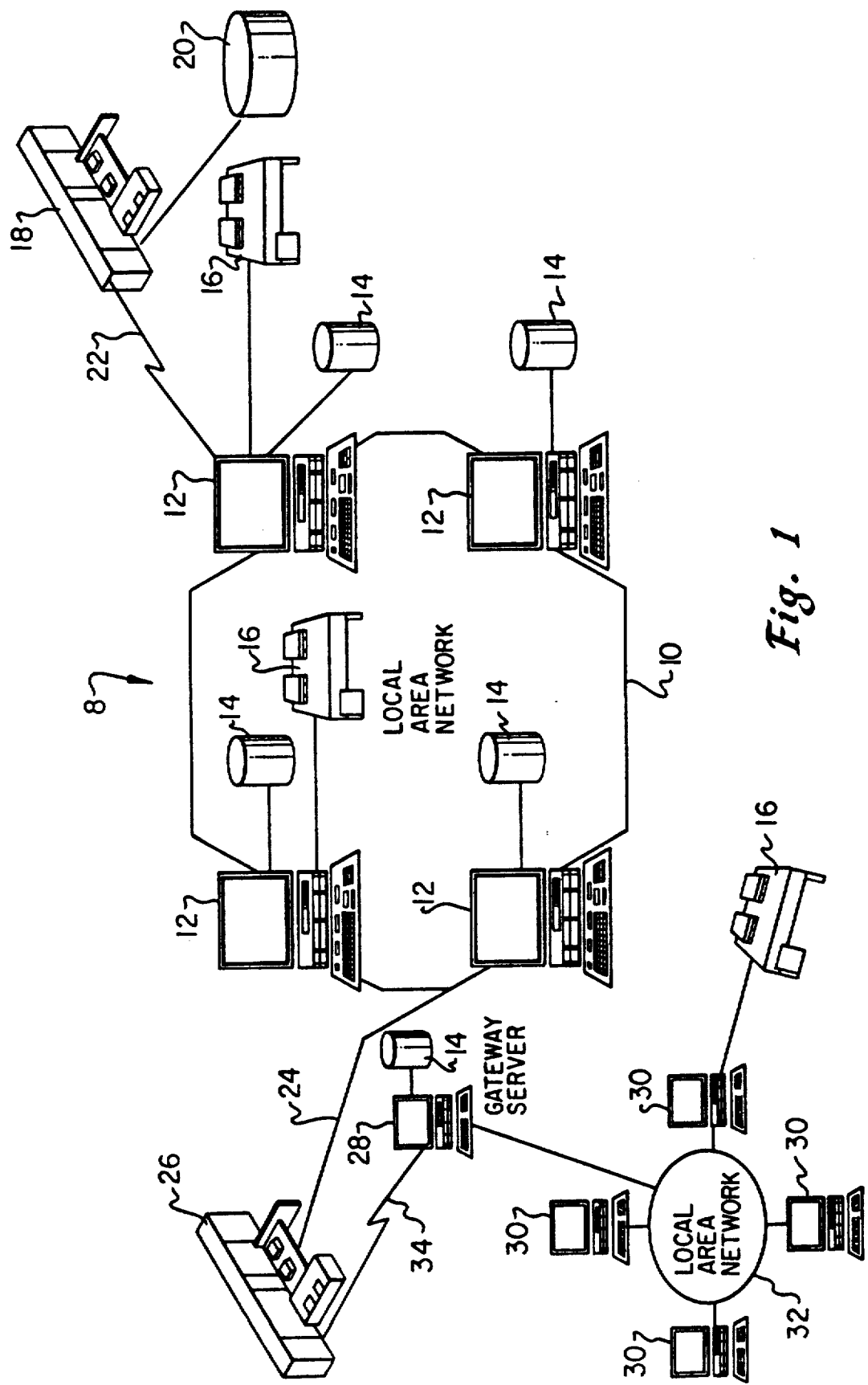
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store applications or resource objects which may be periodically accessed by any user within data processing system 8. In a manner well known in the prior art, each such application or resource object stored within a storage device 14 is associated with a Resource Manager, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10 . Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, resource objects may be stored within storage device 20 and controlled by main frame computer 18, as resource manager for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

In known prior art systems of this type, should the user of an individual computer 30 desire to access a resource object stored within storage device 20, associated with main frame computer 18, it will be necessary for the user of computer 30 to be enrolled within the security system of main frame computer 18. This is necessary in order for the user of computer 30 to present the proper password to obtain access to the desired resource object. Of course, those skilled in the art will appreciate that this technique will prove ungainly in distributed data processing systems, such as data processing system 8 depicted within FIG. 1.

Figure 2:
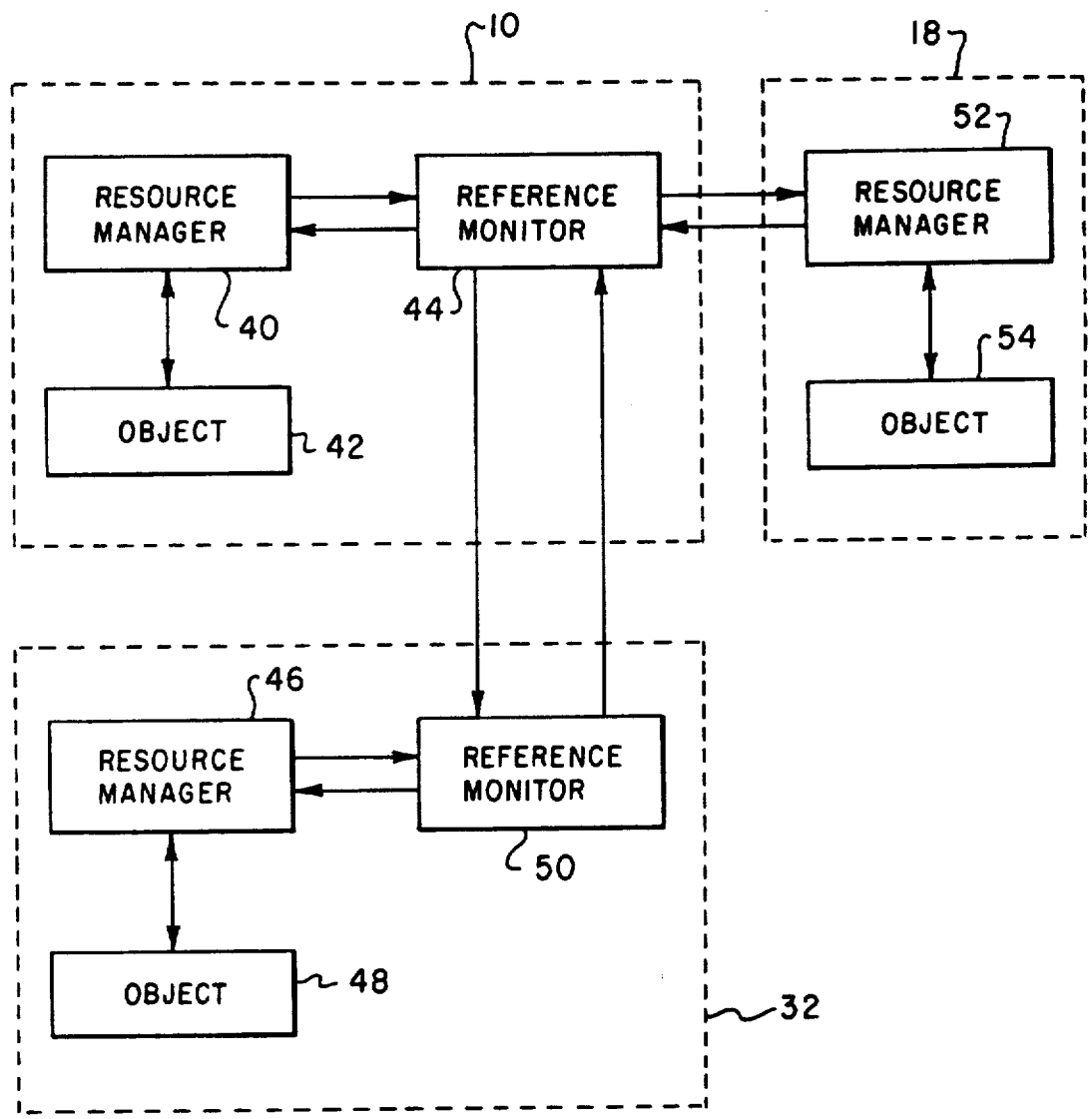
FIG. 2 depicts in block diagram form the access control system utilized with the method of the present invention.

Referring now to FIG. 2, there is depicted in block diagram form the access control system which is utilized with the method of the present invention. As is depicted, Local Area Networks (LAN) 10 and 32 are illustrated by dashed lines as is main frame computer 18. In each instance resource objects 42, 48 and 54 are illustrated in association with each portion of distributed data processing system 8 of FIG. 1. Of course, each object thus illustrated will be stored within one or more storage devices associated with each portion of data processing system 8. As is illustrated, Local Area Network 10 includes a resource manager 40 which may be one or more individual computers which are utilized to manage selected resource objects. Also established within Local Area Network 10 is a Reference Monitor 44. Reference Monitor 44, in accordance with the method of the present invention, is an application or service which is utilized to store access control profiles which may include access control information relating to: selected users; selected levels of authority associated with selected users; selected resource objects; a selected group of users; a selected set of resource objects; or, a predetermined set of resource objects and a selected list of users, each authorized to access at least a portion of said predetermined set of resource objects.

Still referring to FIG. 2, it may be seen that within Local Area Network (LAN) 33 a resource manager 46 is illustrated, which is utilized, in a manner well known in the art, to control access to resource object 48. Similarly, a Reference Monitor 50 is established within Local Area Network (LAN) 32. Reference Monitor 50 is, as described above, preferably utilized to store access control profiles relating to individual users within Local Area Network 32 as well as resource objects stored within Local Area Network 32.

Finally, main frame computer 18 is illustrated as including a resource manager 52 which has associated therewith one or more resource objects 54.

In accordance with an important feature of the present invention, any attempted access of a resource object, such as resource object 42, 48 or 54 will automatically result in a query by the associated resource manager to one or more Reference Monitor applications to determine whether or not the access requested will be permitted. It should be noted that, in accordance with the depicted embodiment of the present invention, only one Reference Monitor application is required for data processing system 8; however, two are illustrated. In accordance with the method of the present invention, communications links between a single Reference Monitor application may be established with each and every resource manager within data processing system 8 (see FIG. 1) so that access to selected resource objects may be controlled in accordance with the access control information stored within the profiles within that Reference Monitor.

In this manner, a user within Local Area Network (LAN) 32 may, via the communications links depicted within FIG. 1, request access to a resource object 54 associated with main frame computer 18. As will be explained in greater detail herein, resource manager 52 will then query Reference Monitor 44 and/or Reference Monitor 50 to determine whether or not a profile exists which permits the requested access. If so, the profile information is exchanged between the appropriate Reference Monitor and resource manager 52 and access to resource object 54 may be permitted.

Figure 3:
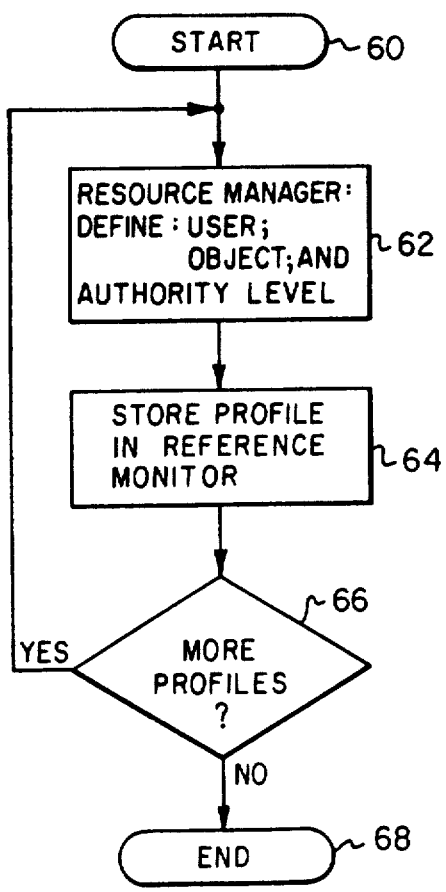
FIG. 3 is a high level flow chart depicting the establishment of a variable authority level user access control system in accordance with the method of the present invention.

With reference now to FIG. 3, there is depicted a high level flow chart depicting the establishment of a variable authority level access control system in accordance wit the method of the present invention. As is illustrated, the process begins at block 60 and thereafter passes to block 62, which depicts the defining of an access control profile for an object or group of objects, by the associated resource manager. As is illustrated, the resource manager may define one or more selected users, one or more particular resource objects, and the authority level which each user may have with respect to a selected object.

By authority level what is meant is whether or not the particular user in question has authority to alter the resource object in question, read the resource object in question, take any action with respect to the resource object or no action with respect to the resource object. Thereafter, block 64 illustrates the storing of that profile within a Reference Monitor application.

Next, block 66 illustrates a determination of whether or not additional profiles are to be established and if so, the process returns to block 62 and continues thereafter in an iterative fashion. In the event no additional profiles are to be created, the process passes to block 68 and terminates.

Figure 4:
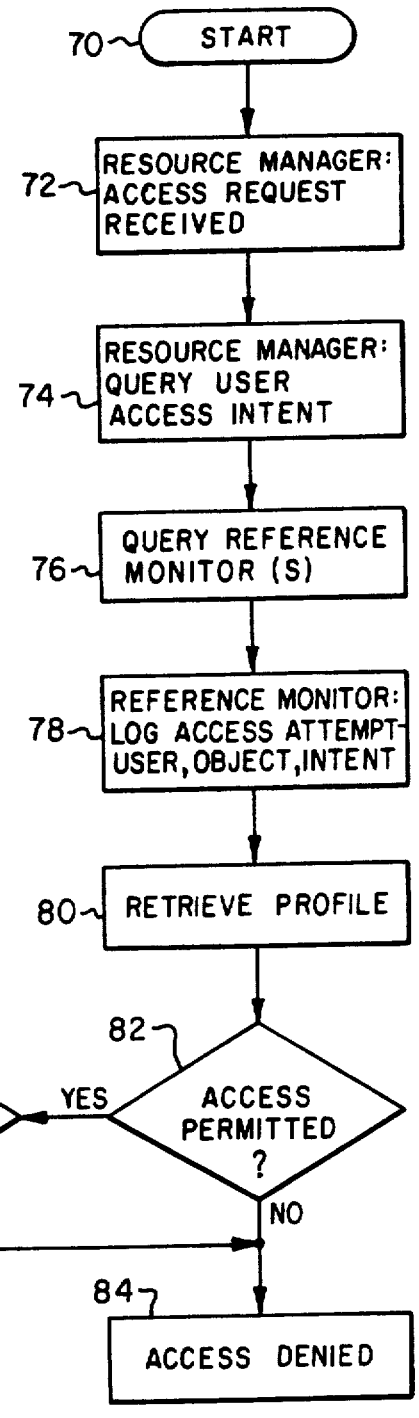
FIG. 4 is a high level flow chart depicting variable authority level access to a resource object in accordance with the method of the present invention.
Figure 4:
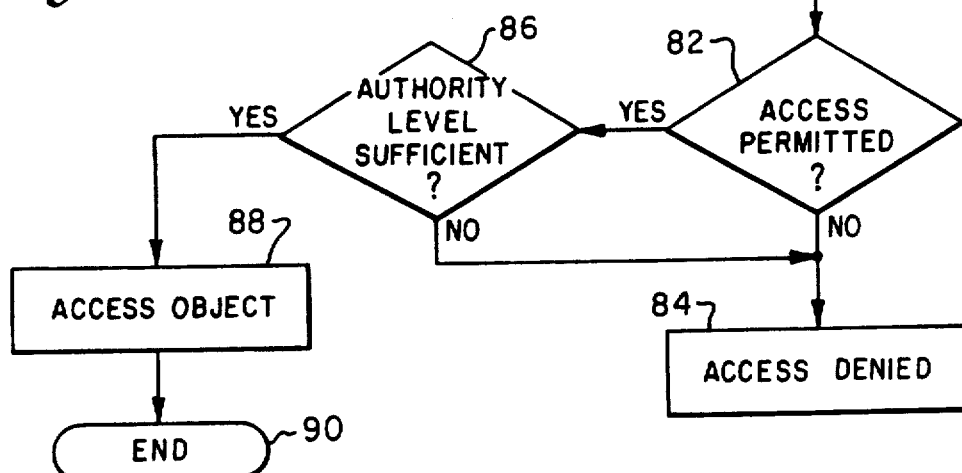

Finally, referring to FIG. 4, there is depicted a high level flow chart depicting access to a resource object in accordance with the method of the present invention. As is illustrated, the process begins at block 70 and thereafter passes to block 72 which illustrates the receipt by a resource manager of an access request for a resource object within that resource manager's purview. Next, the process passes to block 74 which illustrates a query by the resource manager to that user to determine the access intent of the user with regard to the resource object in question. As utilized herein, the phrase "access intent" shall mean a determination of whether or not the user desires to take any of the following actions with regard to a selected resource object: view, update, delete object, grant access, create relationships, or, delete relationships. Of course, this list is not meant to be all-inclusive or limiting in nature.

Next, block 76 illustrates a query by the resource manager to one or more Reference Monitor applications which may exist within the distributed data processing system to determine whether or not an access control profile exists for the resource object or user in question. Block 78 then illustrates the logging of this access attempt at the Reference Monitor application. Such logging shall preferably include the storage of an identification of the particular user, the selected resource object and the stated intent of the user with regard to that particular resource object. Next, block 80 depicts the retrieval of the appropriate access control profile for the particular user or object in question. Block 82 then illustrates a determination of whether or not access to the selected resource object is permitted, in accordance with the information contained within the retrieved profile.

In the event access to the resource object in question is not permitted, as determined by the access control profile thus retrieved, block 84 illustrates the denial of access to the requested resource object by means of an appropriate message to the requester.

In the event access to the resource object in question is to be permitted, as determined in block 82, then block 86 illustrates a determination of whether or not the access control profile indicates the user in question has a sufficient authority level for the access intent which has been entered. If not, block 84 once again illustrates the denial of access to the requested resource object with an appropriate message to the requester. Of course, those skilled in the art will appreciate that where access has been denied due to insufficient authority level, a message may be displayed to the requester indicating that the access intent entered exceeds his or her authority level for the resource object in question. Thereafter, a different access intent may be entered by the requester.

Finally, in the event the authority level contained within the access control profile for a particular user and a selected resource object is sufficient for the access intent entered by the user, as determined in block 86, then block 88 illustrates the accessing of the object in question. Thereafter, the process terminates, as illustrated in block 90.

Upon reference to the foregoing, those skilled in the art will appreciate that by utilizing a plurality of access control profiles stored within a reference monitor service, in accordance with the method of the present invention, it will be possible to define multiple levels of authority which may exist for each user authorized to access a particular resource object. For example, a group of users may be authorized to access a particular object only to view that object and not to update, delete, or modify that object. Further, other selected users may have full authority to modify or delete the resource object, as they desire. By utilizing the method of the present invention, it will be possible to restrict the authority with which each user within the system may enjoy with respect to a particular resource object so that access to those resource objects may not include a concomitant ability to alter or delete the resource object in question. In this manner, information may be more widely disseminated while protecting the integrity of the resource objects containing such information.

While the invention has been particularly shown and described with reference to a preferred embodiment, it will be understood by those skilled in the art that various changes in form and detail may be made therein without departing from the spirit and scope of the invention.

I claim:

1. A computer implemented method of providing variable authority level user access control for a plurality of resource objects within a distributed data processing system having at least one reference monitor service and a plurality of resource managers associated with said plurality of resource objects, each of said plurality of resource managers controlling access to different selected ones of said resource objects, each of said resource managers associated with a reference monitor service, said method comprising the computer implemented steps of:

storing a plurality of unique access control profiles within each said reference monitor service, wherein selected ones of said plurality of access control profiles each include an identification of a selected user and a specified level of authority associated with said selected user;

querying an associated reference monitor service by a selected one of said resource managers in response to an attempted access of a particular resource object by a selected user, wherein access to said particular resource object is controlled by said selected resource manager;

transmitting a selected access control profile associated with said selected user from said associated reference monitor service to said selected one of said resource managers if said selected access control profile existed in said associated reference monitor service; if not, attempting to retrieve said selected access control profile from another said reference monitor service and thereafter transmitting said retrieved access control profile to said selected one of said resource managers;

utilizing said selected resource manager to control access to said particular resource object in accordance with access control information in said selected access control profile; and denying access to said particular resource object by said selected user in response to a failure to retrieve said selected access control profile.

2. The computer implemented method of providing variable authority level user access control for a plurality of resource objects stored within a distributed data processing system according to claim 1, wherein selected ones of said plurality of access control profiles include an identification of a selected group of users and a specified level of authority associated with each user within said selected group of users.

3. A data processing system for providing variable authority level user access control for a plurality of resource objects with a distributed data processing system having at least one reference monitor service and a plurality of resource managers associated with said plurality of resource objects, each of said plurality of resource managers controlling access to different selected ones of said resource objects, each of said source managers associated with a reference monitor service, said data processing system comprising:

means for storing a plurality of unique access control profiles within each said reference monitor service, wherein selected ones of said plurality of access control profiles each include an identification of a selected user and a specified level of authority associated with said selected user;

means for querying an associated reference monitor service by a selected one of said source managers in response to an attempted access of a particular resource object by a selected user, wherein access to said particular resource object is controlled by said selected resource manager;

means for transmitting a selected access control profile associated with said selected user from said associated reference monitor service to said selected one of said resource managers if said selected access control profile existed in said associated reference monitor service; and if not, for attempting to retrieve said selected access control profile from another said reference monitor service and thereafter transmitting said retrieved access control profile to said selected one of said resource managers;

means for utilizing said selected resource manager to control access to said particular resource object in accordance with access control information in said selected access control profile; and means for denying access to said particular resource object by said selected user in response to a failure to retrieve said selected access control profile.

4. The data processing system for providing variable authority level user access control for a plurality of resource objects stored within a distributed data processing system according to claim 3, wherein selected ones of said plurality of access control profiles include an identification of a selected group of users and a specified level of authority associated with each user within said selected group of users.

* * * * *